Patented June 2, 1925.

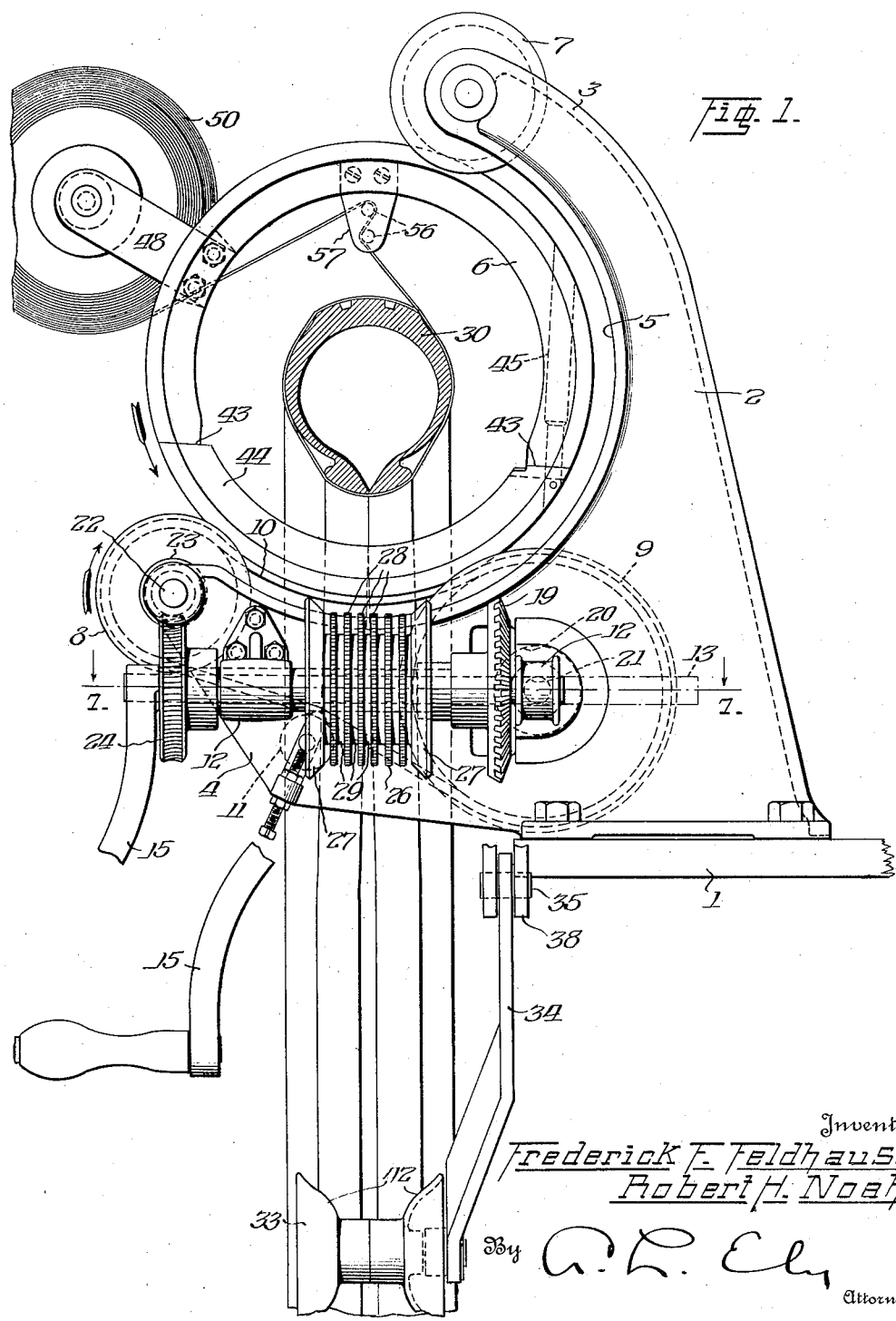

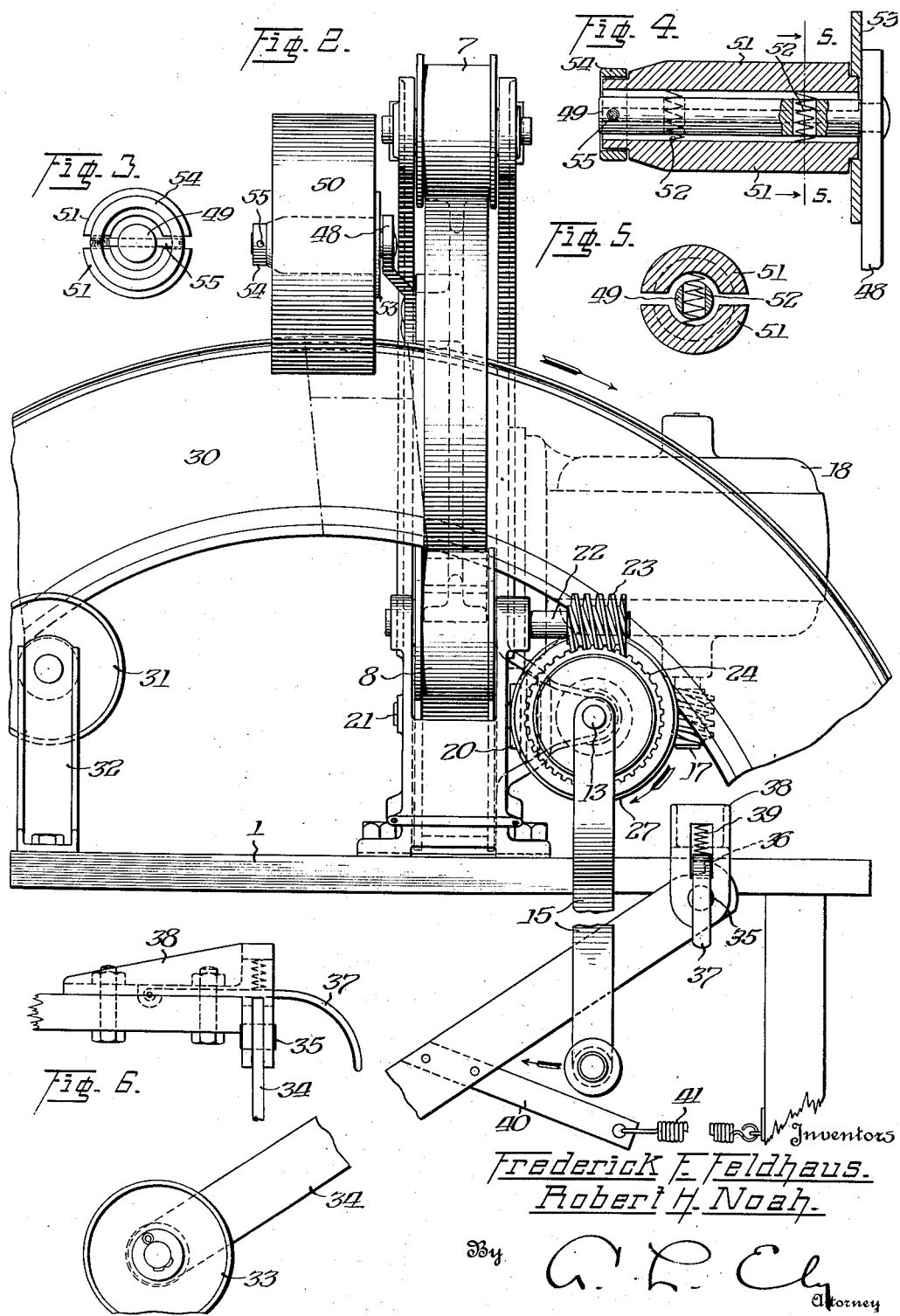

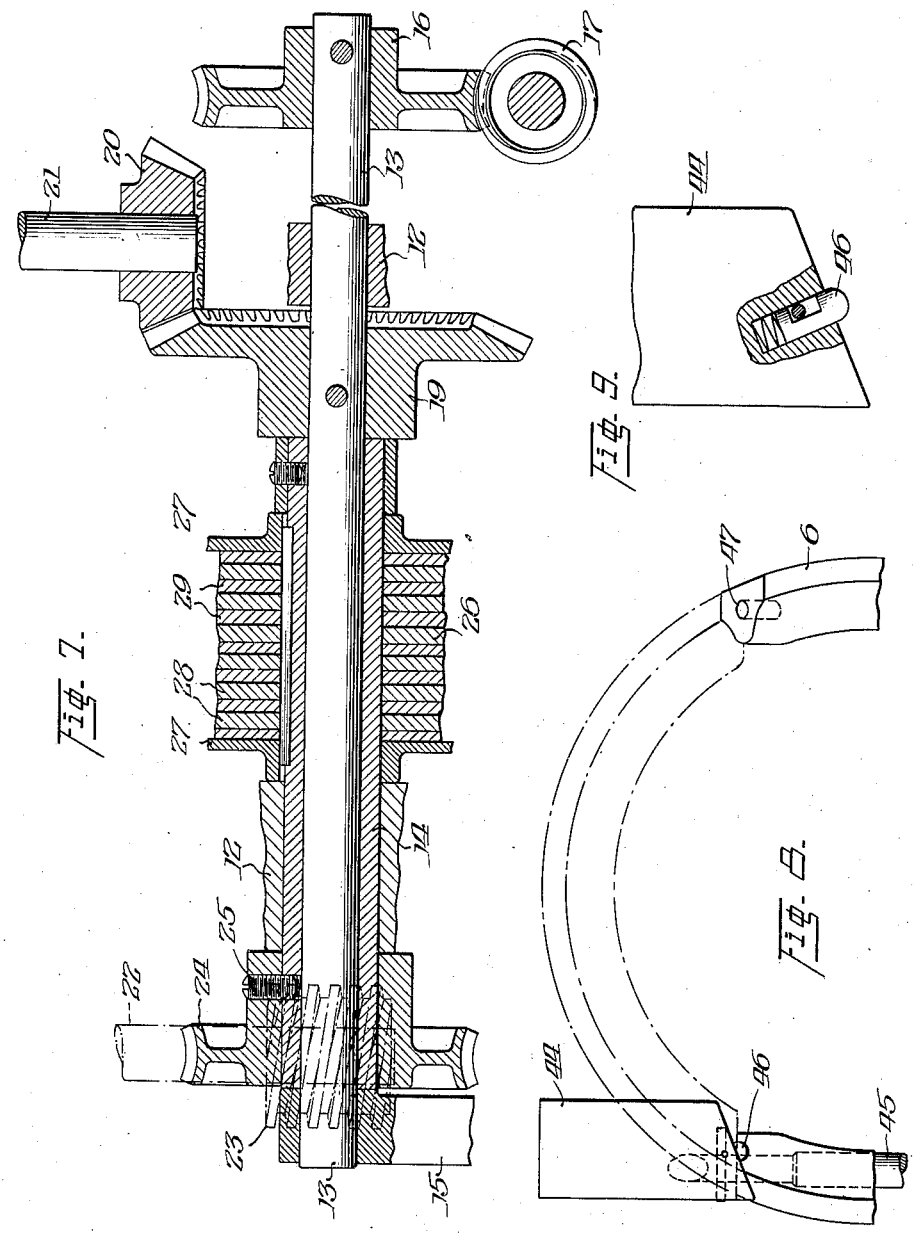

1,540,465

UNITED STATES PATENT OFFICE.

FREDERICK F. FELDHAUS AND ROBERT H. NOAH, OF AKRON, OHIO, ASSIGNORS TO THE AKRON RAPATIRE COMPANY, OF AKRON, OHIO, A CORPORATION OF OHIO.

WRAPPING MACHINE.

Application filed April 9, 1923. Serial No. 630,868.

*To all whom it may concern:*

Be it known that we, FREDERICK F. FELDHAUS and ROBERT H. NOAH, citizens of the United States, and residents of Akron, county of Summit, State of Ohio, have invented certain new and useful Improvements in Wrapping Machines, of which the following is a specification.

This invention relates to a machine for wrapping annular articles, such, for example, as pneumatic tire casings, the machine operating to place a helical wrapping over the surface of the tire.

The object of the invention is to construct a simple, light and easily operated machine which can be turned by hand or by motor power. Wrapping machines of this general character have been in use for a considerable period, but such practical machines as have been made heretofore are adapted for use only in tire factories or other large establishments. It is the purpose of the present invention to construct a machine of this type which will be extremely compact so that it can be carried about and also a machine which can be sold at such a price that it can be installed by dealers or small manufacturers to wrap a limited number of tires economically. This machine is particularly useful in stores or jobbing houses for rewrapping tires received in unwrapped condition.

Further objects of the invention will appear from the extended description herein contained and from the attached drawings which show one form or embodiment of the invention, it being understood that the invention is not limited to the particular form shown, but may be varied or modified within the scope of the invention and the attached claims.

In the drawings:

Figure 1 is a side elevation of the wrapping machine showing a tire thereon (in section) being wrapped;

Figure 2 is a front view;

Figure 3 is a front view of the spindle or spool carrier;

Figure 4 is a longitudinal section thereof;

Figure 5 is a transverse section on the line 5—5 of Figure 4;

Figure 6 is a detail of the latch for holding up the lowermost guide roller;

Figure 7 is a section on the line 7—7 of Figure 1;

Figure 8 is a detail of the shuttle; and

Figure 9 is a detail of the latch on the shuttle.

The machine is secured to a support or stand 1, which may be a table to which the machine is attached or a movable platform. To the table is attached a standard or upright 2 which forms the support for the operative parts of the machine. This standard is formed with an upper horn 3 and a lower horn 4 between which is the circular raceway or opening 5 for housing the shuttle, indicated by the numeral 6.

The shuttle is in the form of a ring 6 which is provided with a smooth exterior surface cradled in three rollers 7, 8 and 9, all of which are provided with side flanges as shown, serving to guide the shuttle in its rotary movement. The roller 7 is journaled in the upper horn 3 and the roller 8 in the lower horn 4. The roller 9 is carried on the stand 2 slightly below and at one side of the roller 8. Over the rollers 8 and 9 is trained a belt 10 which contacts the lower surface of the shuttle 6 and serves to drive it. An adjustable belt tightener 11 is supported in the stand 2 and bears against the lower run of the belt 10.

From the side of the stand 2 project bearings 12 which house the rotatable driving shaft 13, a portion thereof being received in a sleeve 14. The shaft is actuated either by a hand crank 15 at one end or by a worm gear 16 at the other. The gear 16 is driven by a worm 17 attached to the shaft of the motor 18 supported on the side of the stand 2.

A bevel gear 19 is secured directly to the shaft 13 and is in mesh with a bevel pinion 20 carried on the shaft 21 and secured to or a part of the roller 9. The shaft 21 may be extended to and rotated in the bearing 12 if desired. In this manner the belt 10 is driven, rotating the shuttle and the roller 8. The shaft 22 of the roller 8 carries a worm 23 which meshes with worm gear 24 which is secured to the sleeve 14 by a set screw 25. Secured to the sleeve 14 is the tire carrying and driving roller 26. The roller preferably is composed of a pair of oppositely faced flanged disks 27 between which are a series of disks 28 whose outer surfaces are roughened to afford driving contact with the tire and which are spaced apart by smaller disks 29.

Attention is particularly directed to the driving mechanism for the tire 30 and the shuttle 6 as by the compact and simple mechanism shown we are enabled to obtain the correct ratio between the speed of rotation of the shuttle and the advance of the tire, and this result is obtained without the use of extensive gearing or shafting as with former types of wrapping machines.

The tire 30 is supported and driven by the roller 26 and is also supported by a flanged idler roll 31 mounted in a bracket 32 rising from the table 1. The tire is guided by a third flanged roller 33 which is carried on the outer end of a lever 34 pivotally mounted at 35 in the bracket 38 secured to the table. The lever 34 is formed at its upper end with a notch 36 which is engaged by a latch 37 pivoted in the bracket 38 and held down by spring 39. An arm 40 extends from the bracket and is connected by spring 41 to the table. When the arm 34 is raised so that the latch 37 engages notch 36 and when the shuttle is opened, as will be described, a tire or other article is placed on the rollers 26 and 31 and the latch is then released. The spring 41 together with the weight of the roller 33 and the arm 34 causes the lower inner surface of the tire to be engaged and the tire is held in a vertical plane. The rollers 31 and 33 may be of any desired form, but that shown in Figure 1 is preferred, in which the rollers consist of two substantially bell-shaped flanged members 42 which will engage the beads of tires of all sizes and prevent them from spreading.

The shuttle has been described as a ring-shaped member, the outer cylindrical journal surface of which is cradled in the spaced bearing rollers 7, 8 and 9. A portion of the shuttle is cut at two places, indicated by the numeral 43, the plane of the cut being oblique to the plane of the shuttle. On one side the cut out portion 44 of the shuttle is pivoted or hinged, as at 45, so as to swing to open on an axis contained within the periphery of the ring, the shuttle being shown as closed in Figure 8 in dotted lines and open in full lines. A light spring catch 46 is carried in the end of the segment 44 and engages a notch 47 in the opposing end of the shuttle 6.

The wrapping paper 50, or other material to be employed, is carried on a spool or spindle illustrated in Figures 3, 4 and 5. The spindle is carried on a bracket 48 which is attached to and extends outwardly from the ring and is supported on a pin 49 projecting from the bracket. The spool is formed in two parts or halves 51 which are held apart by springs 52 located within the spindle and guided by holes in the pin 49. The inner ends of the spool halves are reduced and held at their outer limits by a plate 53 at the base of the spindle. A collar 54 secured by a pin 55 in the outer end of the pin 49 engages the outer end of the spool halves. The spool is so proportioned that when fully expanded it is greater than the internal diameter of the reel 50 so that the spool exerts a retarding force on the rotation of the reel and imparts tension to the wrapper. The tension thus acquired is oftentimes sufficient, but if additional tension is required, tension pins 56 may be provided on a bracket 57 extending inwardly of the shuttle, around which the paper is looped as shown in Figure 1.

The operation of the machine will have been understood from the description which has been given thus far. The shuttle is moved until the segment 44 is located between the rollers 7 and 8. The shuttle is then opened by swinging the segment outwardly from the plane thereof. A tire is then hung on the rollers 26 and 31 and the roller 33 is forced into contact with the lower inside surface of the shuttle by the spring 41 after release of the latch 37. The shuttle is now closed and the paper started on the tire by rotation of the shaft 13 either through the hand crank or motor. The tension on the paper is sufficient to pull the beads of the tire together as shown in Figure 1 so that a tight wrap will be obtained.

What is claimed is:

1. In a tire wrapping machine, a standard, a rotary shuttle therein and a roller for supporting and advancing a tire through the shuttle and means to rotate the shuttle and the tire comprising a shaft, the roller being freely movable on the shaft, means to drive the shuttle from the shaft, and means to drive the roller from the shuttle.

2. In a tire wrapping machine, a standard, a rotary shuttle therein, two rollers to support the shuttle, a belt connecting said rollers, a power shaft, a tire supporting and driving pulley, and driving connections between the power shaft and one of said rollers and also between the other roller and the pulley.

3. In a tire wrapping machine, a standard, a rotary shuttle therein, two rollers to support the shuttle, a belt connecting said rollers, a power shaft, a tire supporting and driving pulley loosely mounted on the shaft, and driving connections from the power shaft to one of said rollers and from the other roller to the pulley.

4. In a tire wrapping machine, a standard, a rotary shuttle therein, two rollers to support the shuttle, a power shaft, a tire supporting and driving pulley loosely mounted on the shaft, and a driving connection from the power shaft to one of said rollers and from the other roller to the pulley.

5. In a tire wrapping machine, a standard, a rotary shuttle therein, means to support and drive the shuttle, a power shaft, driving connection from the shaft to the shuttle, a tire supporting and driving pulley, and driving connections from the shuttle to the pulley.

6. In a tire wrapping machine, a standard, a rotary shuttle therein, rollers to support the shuttle, a belt connecting the rollers, a power shaft, a sleeve surrounding the power shaft, gearing connecting the power shaft with one of the rollers, gearing connecting the other roller with the sleeve, and a tire supporting and driving roller on the sleeve.

7. In a tire wrapping machine, a pair of supporting rollers on which the tire may be suspended, a lever pivotally mounted and spring actuated, and a roller on the end of the lever adapted to engage the lower inside surface of the tire.

8. In a tire wrapping machine, a pair of supporting rollers on which the tire may be suspended, a lever pivotally mounted and spring actuated, a roller on the end of the lever adapted to engage the lower inside surface of the tire, and a latch to maintain the roller in elevated position.

FREDERICK F. FELDHAUS.
ROBERT H. NOAH.